(12) United States Patent
Frey et al.

(10) Patent No.: US 8,042,666 B2
(45) Date of Patent: Oct. 25, 2011

(54) HYDRODYNAMIC CLUTCH DEVICE

(75) Inventors: Peter Frey, Gerolzhofen (DE); Roland Baumann, Dittelbrunn (DE); Michael Greulich, Schwebheim (DE); Georg Mencher, Grafenrheinfeld (DE); Bernd Reinhardt, Schonungen/Forst (DE); Peter Hammer, Schweinfurt (DE); Patrick Rediger, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 732 days.

(21) Appl. No.: 12/079,391

(22) Filed: Mar. 26, 2008

(65) Prior Publication Data
US 2008/0236974 A1 Oct. 2, 2008

(30) Foreign Application Priority Data
Mar. 26, 2007 (DE) .................. 10 2007 014 312

(51) Int. Cl.
*F16H 45/02* (2006.01)
(52) U.S. Cl. .................................... 192/3.3; 192/110 B
(58) Field of Classification Search .................. None
See application file for complete search history.

(56) References Cited

U.S. PATENT DOCUMENTS

| 4,523,916 | A | | 6/1985 | Kizler et al. | |
|---|---|---|---|---|---|
| 5,575,363 | A | | 11/1996 | Dehrmann et al. | |
| 5,682,969 | A | * | 11/1997 | Ling | 192/3.29 |
| 5,819,896 | A | * | 10/1998 | Fallu | 192/3.29 |
| 5,964,329 | A | | 10/1999 | Kawaguchi et al. | |
| 6,053,292 | A | * | 4/2000 | Macdonald | 192/3.28 |
| 6,431,335 | B1 | * | 8/2002 | Kundermann | 192/3.3 |
| 6,508,346 | B1 | * | 1/2003 | Simpson | 192/3.3 |
| 2002/0175037 | A1 | * | 11/2002 | Wack et al. | 192/3.29 |
| 2007/0181396 | A1 | * | 8/2007 | Maienschein et al. | 192/3.29 |
| 2007/0205067 | A1 | * | 9/2007 | Frey et al. | 192/3.3 |
| 2008/0236975 | A1 | * | 10/2008 | Frey et al. | 192/3.29 |

* cited by examiner

*Primary Examiner* — Rodney Bonck
(74) *Attorney, Agent, or Firm* — Cozen O'Connor

(57) ABSTRACT

A hydrodynamic clutch includes a hydrodynamic circuit formed by at least a pump wheel and a turbine wheel in a clutch housing with a drive-side housing wall extending to the axis of rotation, and a bridging clutch with a piston capable of shifting axially relative to the drive-side housing wall. The turbine wheel is connected to a hub, which is connected for rotation in common to a takeoff, and is axially supported between the hydrodynamic circuit and the clutch housing, and has first and second flow passages which are axially offset from each other. The hub has a drive-side end with an axial bearing area which can be moved into axial contact with an axial bearing, which is either an axial contact surface on the drive-side housing wall or is assigned to the drive-side housing wall.

6 Claims, 3 Drawing Sheets

HYDRODYNAMIC CLUTCH DEVICE

BACKGROUND OF THE INVENTION

1. Field of the Invention

The invention pertains to a hydrodynamic clutch device of the type including a clutch housing which is rotatable about an axis of rotation and has a drive-side housing wall, a hydrodynamic circuit including a pump wheel and a turbine wheel in the clutch housing, and a bridging clutch having a piston capable of shifting axially relative to the drive-side housing wall, the piston separating a pressure space adjacent to the drive-side housing wall from a supply space.

2. Description of the Related Art

A hydrodynamic clutch device designed as a hydrodynamic torque converter is known from U.S. Pat. No. 5,964,329. A pump wheel cooperates with a turbine wheel and a stator to form a hydrodynamic circuit in a clutch housing; this circuit cooperates with a bridging clutch. The bridging clutch has a piston, which can be connected to a drive-side housing wall of the clutch housing and shifted in the axial direction. The piston is centered by a seal on a housing hub, which is mounted on the drive-side housing wall. This housing hub, which acts as a component of the clutch housing, serves as an axial stop for another hub, which holds the turbine wheel and possibly also a component of a torsional vibration damper. For this purpose, the side of this hub facing the housing hub is provided with a stop element, while the opposite axial side is supported by an axial bearing against the stator, which is provided as a component of the hydrodynamic circuit.

First flow channels are provided in the housing hub, and second flow channels are provided in the stop element assigned to the hub. The flow channels of the housing hub are in flow connection with first flow passages in the hub, whereas the flow channels in the stop element are in flow connection with second flow passages in the hub, where the first flow passages are axially offset from the second flow passages. By way of the first flow passages, at least one first takeoff-side flow route is connected to a pressure space, which is bounded at least essentially by the drive-side housing wall of the clutch housing and the piston, and by way of the second flow passages at least one second takeoff-side flow route is connected to a supply space, which is adjacent to the side of the piston facing away from the pressure space.

The disadvantage of the known hydrodynamic clutch device is the considerable expense which is associated with the housing hub mounted on the drive-side housing wall, because this housing hub not only must be dimensioned in the axial direction in such a way that it positions the hub, which holds the turbine wheel and/or a component of the torsional vibration damper axially with respect to the stator, but also must be dimensioned radially in such a way that it centers the hub and also the piston of the bridging clutch. It must also be ensured, furthermore, that the flow channels of the housing hub are at least essentially aligned with the flow passages of the hub.

SUMMARY OF THE INVENTION

The invention is based on the task of positioning a hub, which holds a turbine wheel and/or a component of a torsional vibration damper, and a piston of a bridging clutch with the least possible effort in a clutch housing of a hydrodynamic clutch device. That is, the hub is to be positioned at least in the axial direction, and the piston is to be positioned at least in the radial direction.

Before the design of the hub is discussed in detail, its function in the hydrodynamic clutch device must be explained more precisely. This hub can serve to hold the turbine wheel and/or a component of a torsional vibration damper directly; or it can serve to hold the turbine wheel indirectly, such as by way of a component of the torsional vibration damper; or it can serve to hold a component of the torsional vibration damper indirectly, such as by way of the turbine wheel. This hub is therefore referred to in the following in brief as the "carrier hub".

According to the invention, either a drive-side housing wall of a clutch housing of the hydrodynamic clutch device acts as an axial bearing for the carrier hub, or an axial bearing for the carrier hub is assigned to the drive-side housing wall. In the former case, the axial bearing area of the carrier hub facing the drive-side housing wall arrives in axial contact with an axial contact surface of the drive-side housing wall; in the other case, it arrives in contact with the axial bearing assigned to the drive-side housing wall. The essential point is that, in both possible variants, it is possible to eliminate the housing hub which would have to be mounted on the drive-side housing wall. It is significant that, to provide axial support for the carrier hub, the drive-side housing wall is extended radially inward essentially as far as the axis of rotation of the clutch housing, so that in this way the carrier hub can be offered the required axial support in the direction toward the drive.

The drive-side housing wall preferably has an axial recess in said drive-side housing wall to form the axial contact surface. If this axial recess is larger in the radial direction than the diameter of the carrier hub, the carrier hub will still be cleanly supported by the side of its axial bearing area which faces the drive-side housing wall, but it will also have room in the radial direction to extend across the axial recess in cases where the manufacturing tolerances of the carrier hub are superimposed unfavorably on the those of the takeoff, such as a gearbox input shaft. By means of an essentially arc-like section at the transition from the axial contact surface within the axial recess to the adjacent radial area of the drive-side housing wall, it is still possible to ensure, even under extreme tolerance conditions, that this axial bearing area of the carrier hub can be given suitable axial support. Alternatively, this radial area of the axial recess can also have an embossed area, as a result of which a surface of special quality is obtained, which ensures that the carrier hub will be accommodated with very low friction on the drive-side housing wall.

When an axial contact element is assigned to the drive-side housing wall, especially to the axial recess in that wall, it is ensured—insofar as this axial contact element has a sufficient degree of hardness—that no wear will occur on the axial contact surface of the drive-side housing wall, and that therefore the carrier hub will not be subjected to any undesirable play in the axial direction. It is especially preferable for the axial contact element to be made of spring steel. A solution of this type is especially favorable in cases where the carrier hub is made of sintered material. Using a sintering process to produce the carrier hub is advantageous because it allows the production of relatively complicated hub designs, but it also gives the carrier hub a relatively high degree of hardness, so that the carrier hub is not subject to significant wear even in the axial bearing area facing the drive-side housing wall.

A piston of a bridging clutch is preferably centered on the carrier hub and is capable of shifting position axially with respect to the carrier hub. Thus a housing hub is not needed for the piston either. By the insertion of an intermediate seal between the piston and the carrier hub, it is ensured that the hydraulic medium which has flowed via the two flow passages provided in the carrier hub will not be able to pass from one of the two spaces, i.e., the pressure space or the supply space, into the other space, which would thus make it unavailable for its actual purpose. For the same reason, the takeoff, preferably a gearbox input shaft, also acts on the carrier hub by way of a seal.

By designing the first flow passages in the axial bearing area of the carrier hub in the form of groovings, a fluid film, which ensures very low friction at this point, develops axially between the axial bearing on the drive-side housing wall and the axial bearing area of the carrier hub. In addition, because of these groovings, there is no longer any need for the otherwise necessary openings in the carrier hub, produced in the form of bores, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
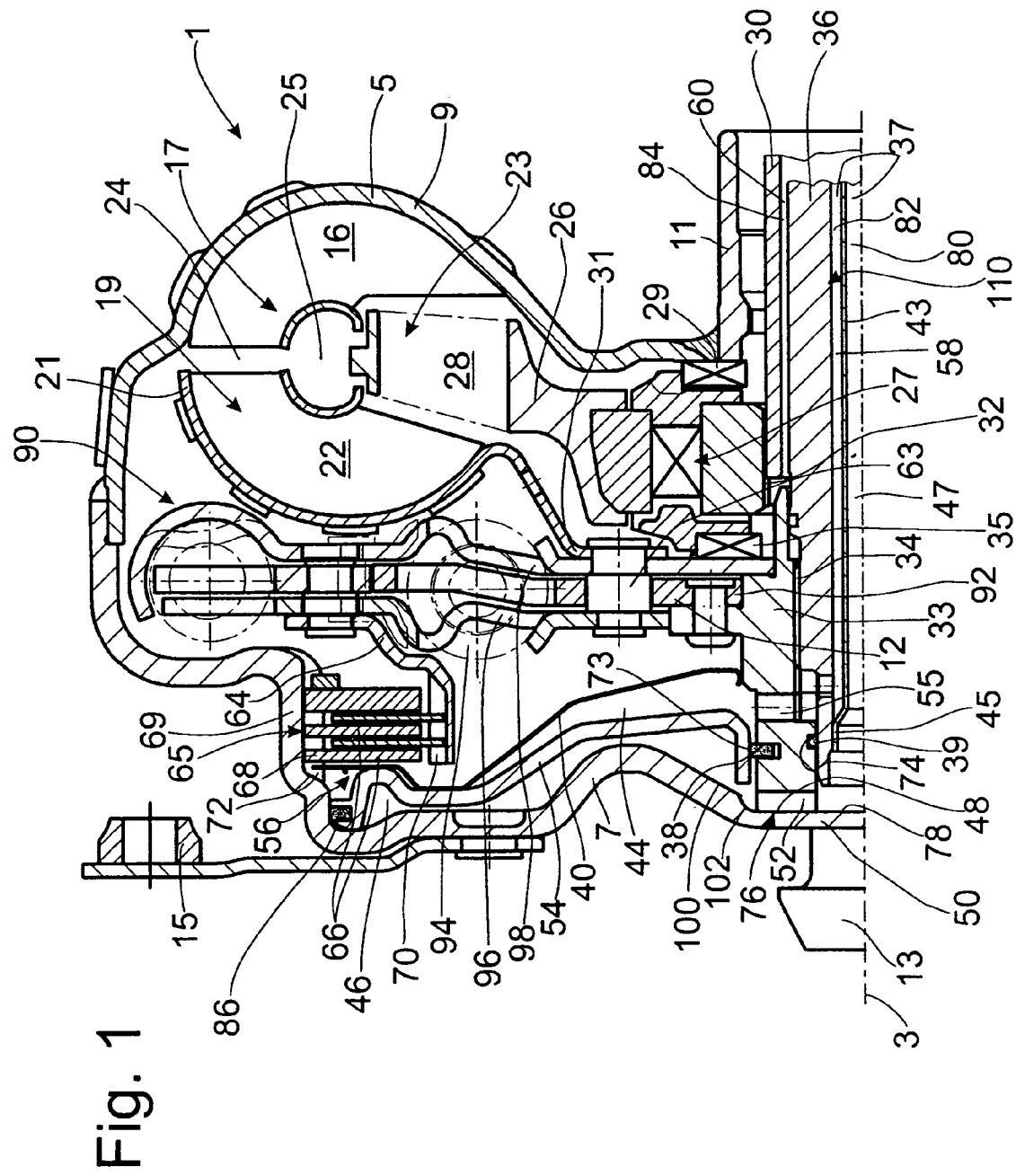
FIG. 1 shows the upper half of a longitudinal cross section through a clutch housing of a hydrodynamic clutch device with a hub, which serves to hold a torsional vibration damper and a turbine wheel by way of a component of the torsional vibration damper, and with the piston of a bridging clutch.

FIG. 1 shows a hydrodynamic clutch device 1, designed as a hydrodynamic torque converter. The hydrodynamic clutch device 1 has a clutch housing 5, which is able to rotate around an axis of rotation 3. On the side facing a drive (not shown), such as the crankshaft of an internal combustion engine, the clutch housing 5 has a drive-side housing wall 7, which is permanently connected to a pump wheel shell 9. This merges in the radially inner area with a pump wheel hub 11.

To return to the drive-side housing wall 7: On the side facing the drive (not shown), this wall has a bearing journal 13, which, in a manner which is already known and therefore not illustrated in detail, is supported on an element of the drive, such as the crankshaft, for the drive-side mounting of the clutch housing 5. In addition, the drive-side housing wall 7 has fastening mounts 15, which serve in the conventional manner to allow the clutch housing 5 to be fastened to the drive, preferably by way of a flexplate (not shown). With respect to drawings which show the mounting of the bearing journal of a hydrodynamic clutch element in a crankshaft of a drive and the connection of the hydrodynamic clutch device by way of a flexplate to the crankshaft, reference can be made by way of example to FIG. 1 of U.S. Pat. No. 4,523,916, which is incorporated herein by reference.

The previously mentioned pump wheel shell 9 cooperates with pump wheel vanes 16 to form a pump wheel 17, which works together with, first, a turbine wheel 19 consisting of a turbine wheel shell 21 and turbine wheel vanes 22, and, second, with a stator 23. The pump wheel 17, the turbine wheel 19, and the stator 23 form a hydrodynamic circuit 24 in the known manner, which encloses an internal torus 25.

It should also be mentioned that the stator vanes 28 of the stator 23 are mounted on a stator hub 26, which is itself mounted on a freewheel 27. The latter is supported axially by an axial bearing 29 against the pump wheel hub 11 and is connected nonrotatably but with freedom of relative axial movement by way of a set of teeth 32 to a support shaft 30, which is located radially inside the pump wheel hub 11. The support shaft 30, which is itself designed as a hollow shaft, radially encloses a gearbox input shaft 36, serving as the takeoff 110 of the hydrodynamic clutch device 1, this input shaft being provided with a central bore 37. This central bore 37 holds a sleeve 43 in such a way that the sleeve 43 is centered radially in the central bore 37 by support areas 45. With an axial offset from these support areas 45, the sleeve 43 forms a first supply channel 58 for fluid medium radially between itself and the enclosing wall of the center bore 37. Radially inside the sleeve 43 there remains a channel, i.e., the central supply channel 47.

The gearbox input shaft 36 has a set of teeth 34 by which it holds a hub 33 so that it cannot rotate but is free to move in the axial direction. A component 12 of a torsional vibration damper 90 is attached to the radially outer area of this hub 33, this component 12 being formed by a takeoff-side hub disk 92 of the torsional vibration damper 90. This hub disk 92 has a set of circumferential springs 94 by which it cooperates with two cover plates 96, 98, which represent additional components of the torsional vibration damper 90, where the cover plate 98 serves to accept a turbine wheel base 31 by means of a riveted connection 63, whereas the other cover plate 96 is designed so that an inner plate carrier 64 of a clutch device 65, which is designed as a multi-plate clutch, can be attached to it. The clutch device 65 has both inner clutch elements 66, which are connected nonrotatably to the inner plate carrier 64 by a set of teeth 70 on the carrier, and outer clutch elements 68, which can be brought into working connection with the inner clutch elements 66, where the outer clutch elements 68 are connected for rotation in common to the drive-side wall 7 and thus to the clutch housing 5 by means of a set of teeth 72, acting as an outer plate carrier 69. The clutch device 65 can be engaged and disengaged by means of an axially movable piston 54 and cooperates with the piston 54 to form a bridging clutch 56 of the hydrodynamic clutch device 1. As FIG. 1 shows, a separating plate 40 can be provided between the piston 54 and the torsional vibration damper 90 to isolate the hydrodynamic circuit 24 from a supply space 44, bounded axially by the piston 54 and the separating plate 40. On the side of the piston 54 facing away from this supply space 44, a pressure space 46 is provided, bounded axially by the piston and by the drive-side housing wall 7. The piston 54 is centered in the clutch housing 5 by a seal 86, which holds the piston in place and seals it off against the housing.

The hub 33 is called in the following the "carrier hub" 33, because it holds not only the torsional vibration damper 90 but also, indirectly, i.e., by way of the vibration damper, the turbine wheel 19. On one side, this hub is supported against the freewheel 27 by way of the cover plate 98 and an axial bearing 35, whereas, on the other side, i.e., at the end facing the drive-side wall 7, which forms an axial bearing area 48, it can be supported axially against an axial contact surface 50 of the drive-side housing wall 7, where this axial contact surface 50 extends radially outward from the axis of rotation 3 of the clutch housing 5. The bearing journal 13 is attached to the opposite side of the drive-side housing wall 7 of the clutch housing 5, inside the area over which this axial contact surface 50 extends.

Figure 2:
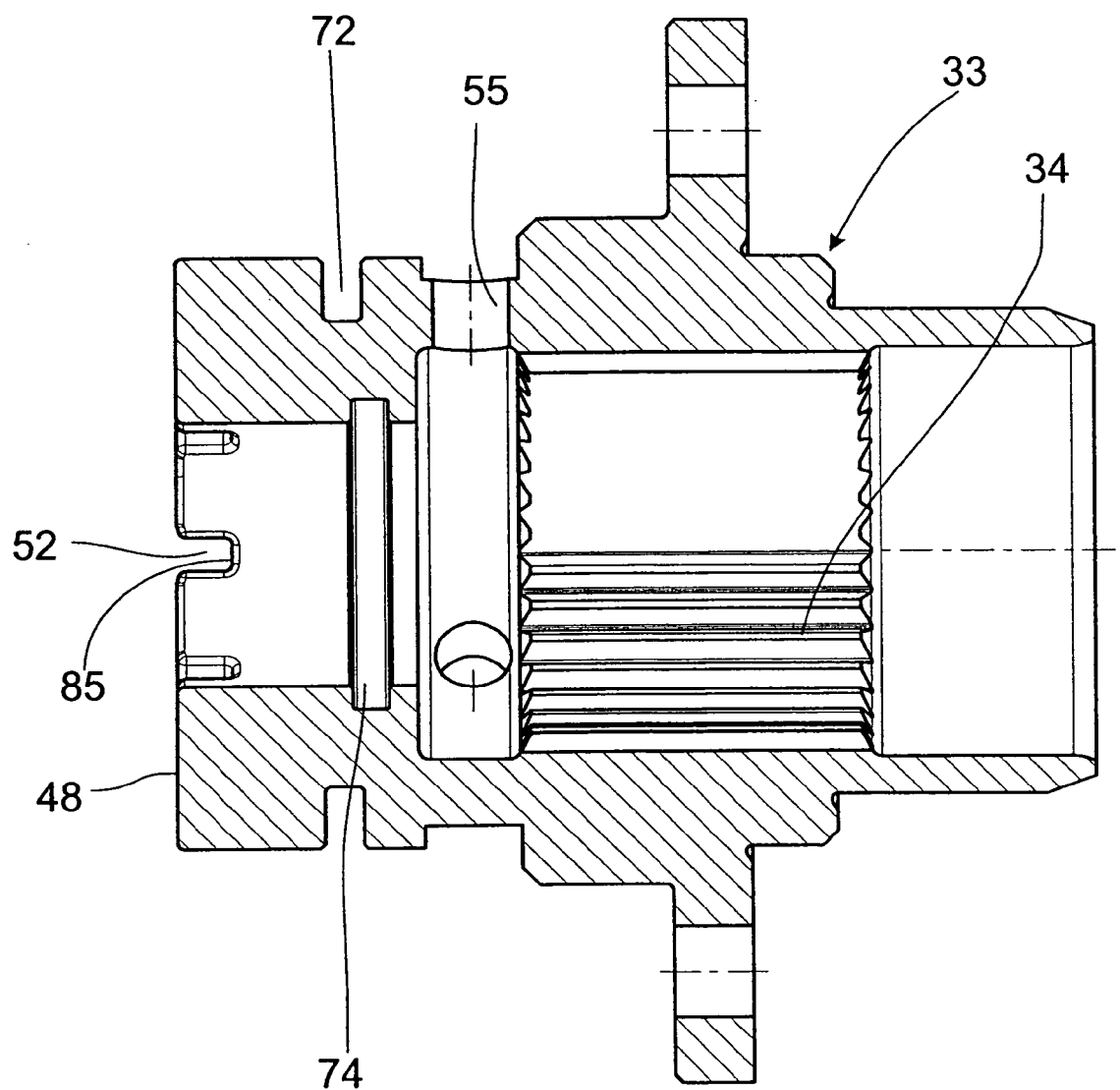
FIG. 2 shows a cross section through the hub as an isolated part.

Radially on the inside, the carrier hub 33 is sealed off against the gearbox input shaft 36 by a seal 39, which is held in a seal recess 74 (see also FIG. 2); radially on the outside, it is sealed off against the piston 54 of the bridging clutch 56 by a seal 38, held in a seal recess 73. These two seals 38, 39 separate first flow passages 52, which pass through the carrier hub 33 in its axial bearing area 48 and are preferably designed with grooves 85 (see FIG. 2) in the axial bearing area 48, from second flow passages 55, which are formed in the axial part of the carrier hub 33 between the piston 54 and the torsional vibration damper 90. The first flow passages 52 are in flow connection with the central supply channel 47 of the sleeve 43, which acts as the first takeoff-side flow route 80, whereas the second flow passages 55 are in flow connection with the first supply channel 58 located radially between the sleeve 43 and the wall of the central bore 37 in the gearbox input shaft 36 surrounding the sleeve, where this supply channel 58 acts as the second takeoff-side flow route 82. In addition, a second supply channel 60 is provided radially between the gearbox input shaft 36 and the support shaft 30, which serves as a third takeoff-side flow route 84.

By way of the first flow passages 52, the first takeoff-side flow route 80 serves to establish a positive pressure in the pressure space 46 versus the supply space 44 and thus to actuate the piston 54 of the bridging clutch 56, causing it to engage, i.e., to move toward the clutch device 65, as a result of which a frictional connection is produced between the individual clutch elements 66, 68. To generate this positive pressure in the pressure space 46 versus the supply space 44, there must be a connection of the first takeoff-side flow route 80 with a control device and a hydraulic fluid reservoir. Neither the control device nor the hydraulic fluid reservoir is shown in the drawing, but they can be found in FIG. 1 of U.S. Pat. No. 5,575,363, which is incorporated herein by reference.

By way of the set of teeth 34 and the second flow channels 55, the second takeoff-side flow route 82 leading to the supply space 44 serves to produce a positive pressure in this space versus the pressure space 46 and thus to actuate the piston 54 of the bridging clutch 56, causing it to disengage, i.e., to move away from the clutch device 65, as a result of which the frictional connection between the individual clutch elements 66, 68 of the clutch device 65 is broken. To generate this positive pressure in the supply space 44 versus the pressure space 46, there must be a connection between the second takeoff-side flow route 82 and the previously mentioned control device and the previously mentioned hydraulic fluid reservoir.

Fluid medium which has arrived in the supply space 44 via the second takeoff-side flow route 82 and the second flow passages 55 cools the clutch elements 66, 68 of the clutch device 75 and then enters the hydrodynamic circuit 24, from which it emerges again via the third takeoff-side flow route 84.

To return to the drive-side housing wall 7 of the clutch housing 5: In this wall, the axial contact surface 50 acting as the axial bearing 76 is provided within the radial dimension of an axial recess 78, which merges into the radially adjacent area 100 of the drive-side housing wall 7 by means of an arc-shaped section 102. The axial recess 78 is larger in the radial direction than the radial dimension of the axial bearing area 48 of the carrier hub 33, so that even unfavorable radial tolerances with respect to the positioning of the gearbox input shaft 36 and/or the carrier hub 33 versus the axial support of the carrier hub 33 can be easily accommodated.

Figure 3:
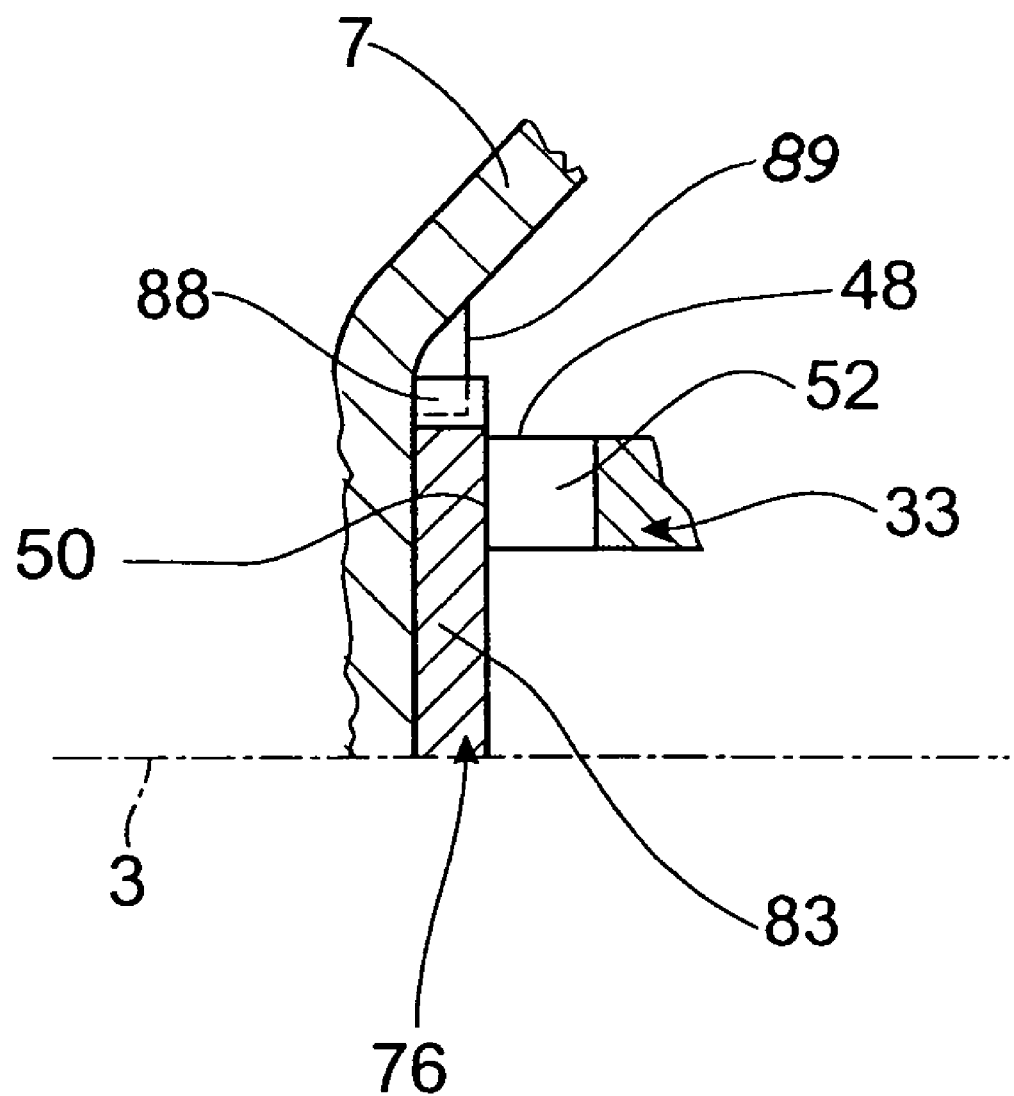
FIG. 3 shows, in isolation, a section of the clutch housing serving to provide the hub with axial support.

The carrier hub 33 is preferably produced by means of a sintering process and therefore consists of sintered metal. In this way, it is easy to produce a carrier hub 33 with its relatively complicated geometry, but in addition a carrier hub 33 produced in this way has comparatively high strength, which is advantageous in the sense that the axial bearing area 48 of the carrier hub 33, which is subjected to relative movement versus the drive-side housing wall 7, will experience little wear. So that significant wear can also be avoided on the drive-side housing wall 7, it can be effective to introduce an axial contact element 83 into the axial recess 78, as shown in FIG. 3. This contact element preferably consists of a material of high hardness such as spring steel, so that this axial contact element 83 can be used as an axial bearing 76 for the axial bearing area 48 of the carrier hub 33. For this purpose, this axial contact element 83 has the required axial contact surface 50 on the side facing the axial bearing area 48 of the carrier hub 33. This axial contact element 83 can be mounted non-rotatably on the drive-side housing wall 7 by means of, for example, a set of teeth 88. These teeth 88 mate with corresponding teeth 89 formed around the recess 78 in the wall 7.

Alternatively, the drive-side housing wall 7 can have an embossed area over the radial dimension of the axial recess 78, so that, in this way, an axial contact surface 50 of high surface quality for the axial support area 48 of the carrier hub 33 can be created, which minimizes the wear-increasing effects of friction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
 a clutch housing which is rotatable about an axis of rotation and has a drive-side housing wall which extends radially inward at least essentially as far as said axis, the drive-side housing wall has an axial recess and radially inward extending teeth around said recess;
 a hydrodynamic circuit comprising a pump wheel and a turbine wheel in said clutch housing;
 a bridging clutch having a piston capable of shifting axially relative to said drive-side housing wall, the piston separating a pressure space adjacent to the drive-side housing wall from a supply space;
 a hub which is supported axially between the hydrodynamic circuit and the drive-side housing wall, the hub being connected for rotation in common to a take-off, the hub having at least one first flow passage connecting a first take-off side flow channel to the pressure space, at least one second flow passage connecting a second take-off side flow channel to the supply space, and a drive-side end with an axial bearing area;
 an axial contact surface provided between the drive-side housing wall and the axial bearing area the axial contact surface being provided in the axial recess; and an axial contact element received in said recess, the axial contact element having a higher hardness than the drive-side housing wall, the axial contact surface being provided on the axial contact element, wherein the drive-side end of the hub has radially extending grooves which form the first flow passages, wherein, said axial contact element has radially outward extending teeth which cooperate with said radially inward extending teeth to prevent rotation of said axial contact element with respect to said drive-side housing wall.

2. The hydrodynamic clutch device of claim 1 wherein the axial recess extends radially beyond the axial bearing area of the hub, the drive-side housing wall having an arc-shaped section which bounds the axial contact surface radially.

3. The hydrodynamic clutch device of claim 1 wherein the axial recess has an embossed area which forms said axial contact surface.

4. The hydrodynamic clutch 1 wherein the hub is made of sintered material.

5. The hydrodynamic clutch device of claim 1 wherein the hub supports the piston of the bridging clutch, the hub being provided with a ring seal between the hub and the piston.

6. The hydrodynamic clutch device of claim 1 further comprising a ring seal between the hub and the take-off.

* * * * *